United States Patent
Jones et al.

(10) Patent No.: US 12,555,763 B2
(45) Date of Patent: Feb. 17, 2026

(54) TISSUE ANALYSIS

(71) Applicant: Micromass UK Limited, Wilmslow (GB)

(72) Inventors: Emrys Jones, Manchester (GB); Richard Chapman, Westborough, MA (US); Steven Derek Pringle, Darwen (GB); Michael Raymond Morris, Glossop (GB)

(73) Assignee: Micromass UK Limited, Wilmslow (GB)

( * ) Notice: Subject to any disclaimer, the term of this patent is extended or adjusted under 35 U.S.C. 154(b) by 992 days.

(21) Appl. No.: 17/277,003

(22) PCT Filed: Sep. 17, 2019

(86) PCT No.: PCT/GB2019/052622
§ 371 (c)(1),
(2) Date: Mar. 17, 2021

(87) PCT Pub. No.: WO2020/058705
PCT Pub. Date: Mar. 26, 2020

(65) Prior Publication Data
US 2022/0037140 A1    Feb. 3, 2022

(30) Foreign Application Priority Data
Sep. 17, 2018  (GB) .................................... 1815123

(51) Int. Cl.
*H01J 49/16*    (2006.01)
*G01N 1/06*    (2006.01)
(Continued)

(52) U.S. Cl.
CPC .............. *H01J 49/164* (2013.01); *G01N 1/06* (2013.01); *G01N 1/30* (2013.01); *G01N 27/623* (2021.01);
(Continued)

(58) Field of Classification Search
None
See application file for complete search history.

(56) References Cited

U.S. PATENT DOCUMENTS

| | | |
|---|---|---|
| 2007/0114388 A1 | 5/2007 | Ogawa et al. |
| 2008/0278706 A1 | 11/2008 | Murayama et al. |

(Continued)

FOREIGN PATENT DOCUMENTS

| | | | | |
|---|---|---|---|---|
| EP | 2325649 A1 * | 5/2011 | ......... | G01N 33/6851 |
| EP | 1427810 B1 * | 10/2011 | ......... | G01N 33/5011 |

(Continued)

OTHER PUBLICATIONS

Combined Search and Examination Report for GB Patent Application No. GB2219103.5, mailed Mar. 8, 2023.
(Continued)

*Primary Examiner* — Andrew Smyth
(74) *Attorney, Agent, or Firm* — Goodwin Procter LLP

(57) ABSTRACT

Disclosed herein is a method of analysing a tissue sample. The method comprises identifying one or more regions of interest within the tissue sample based on a tissue stain that has been applied to the tissue sample. Analyte material is then generated from the one or more regions of interest identified based on the tissue stain using a direct surface sampling probe (10), which analyte material is then received at a sampling inlet (30) and passed towards a mass and/or ion mobility spectrometer (50) for analysis.

18 Claims, 11 Drawing Sheets

(51) Int. Cl.
   *G01N 1/30*       (2006.01)
   *G01N 27/623*     (2021.01)
   *G01N 33/68*      (2006.01)
   *G01N 33/92*      (2006.01)
   *G06N 20/00*      (2019.01)
   *G06T 7/00*       (2017.01)
   *G06T 7/11*       (2017.01)
   *H01J 49/00*      (2006.01)
   *H01J 49/04*      (2006.01)

(52) U.S. Cl.
   CPC ......... *G01N 33/6851* (2013.01); *G01N 33/92* (2013.01); *G06N 20/00* (2019.01); *G06T 7/0012* (2013.01); *G06T 7/11* (2017.01); *H01J 49/0004* (2013.01); *H01J 49/0463* (2013.01); *G01N 2001/302* (2013.01); *G06T 2207/20081* (2013.01); *G06T 2207/30024* (2013.01)

(56) References Cited

U.S. PATENT DOCUMENTS

| | | | |
|---|---|---|---|
| 2016/0139143 A1* | 5/2016 | Hong | G01N 33/6848 435/7.1 |
| 2018/0042582 A1 | 2/2018 | Pringle et al. | |

FOREIGN PATENT DOCUMENTS

| | | | | | |
|---|---|---|---|---|---|
| EP | 1427810 B9 | * | 4/2012 | ......... | G01N 33/5011 |
| JP | 2017056231 A | * | 3/2017 | ............... | G01N 1/02 |
| WO | WO-2014079802 A2 | * | 5/2014 | ............ | H01J 49/105 |
| WO | 2016142675 A1 | | 3/2016 | | |
| WO | 2016142679 A1 | | 9/2016 | | |
| WO | 2016142696 A1 | | 9/2016 | | |
| WO | WO-2016142681 A1 | * | 9/2016 | ........... | G01N 27/623 |
| WO | WO-2016142689 A1 | * | 9/2016 | ............. | A61B 1/041 |
| WO | 2018026898 A1 | | 2/2018 | | |

OTHER PUBLICATIONS

Examination Report for GB Patent Application No. GB2219103.5, mailed May 2, 2023.
International Search Report and Written Opinion for International Application No. PCT/GB2019/052622, mailed Dec. 2, 2019.
Chaurand, P., et al., "Integrating Histology and Imaging Mass Spectrometry", Analytical Chemistry, American Chemical Society, 76(4):1145-1155, Jan. 9, 2004.
Search Report for GB Application No. GB1815123.3, mailed Mar. 28, 2019.
Search Report for GB Application No. GB1913421.2, mailed Nov. 17, 2020.
Combined Search and Examination Report for GB Application No. GB1913421.2, mailed Mar. 12, 2020.

* cited by examiner

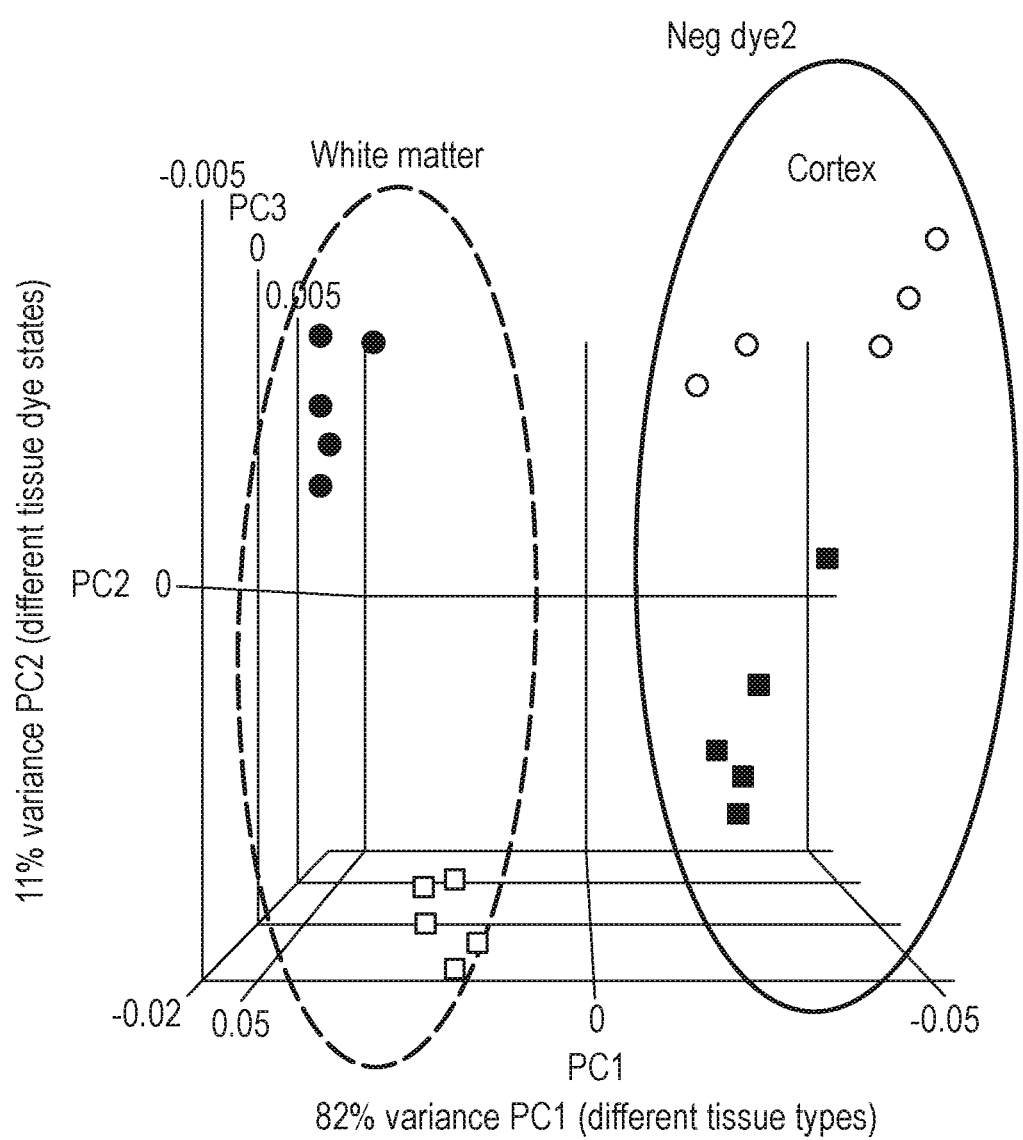

TISSUE ANALYSIS

CROSS-REFERENCE TO RELATED APPLICATIONS

This application is a U.S. national phase filing claiming the benefit of and priority to International Patent Application No. PCT/GB2019/052622, filed Sep. 17, 2019, which claims priority from and the benefit of United Kingdom patent application No. 1815123.3 filed on Sep. 17, 2018. The entire contents of these applications are incorporated herein by reference.

FIELD OF THE INVENTION

The present invention relates generally to methods and systems of analysis, particularly to methods of analysing tissue samples.

BACKGROUND

In mass spectrometry imaging, the spatial distribution of the composition of a sample is visualised by analysing ions produced by sampling analyte material from multiple different regions of the sample, e.g. across the surface of the sample. Mass spectrometry imaging may thus enable the accurate localisation of molecules from a tissue section and has become an established analytical tool for bio-molecular research. However, mass spectrometry imaging using conventional techniques can be very time consuming. For example, a typical analysis of a sample of tissue section deposited on a glass slide can often take many hours or even days.

SUMMARY

According to a first aspect there is provided a method of analysing a tissue sample, the method comprising:
  identifying one or more regions of interest within the tissue sample based on a tissue stain that has been applied to the tissue sample;
  generating analyte material from the one or more regions of interest identified based on the tissue stain using a direct surface sampling technique;
  receiving the generated analyte material at a sampling inlet; and
  passing the analyte material towards a mass and/or ion mobility spectrometer for analysis.

Thus, in embodiments, one or more regions of interest (e.g. regions that contain 'non-normal' tissue) can be identified based on a tissue stain, and the tissue staining can thus be used to direct a subsequent mass and/or ion mobility analysis. For instance, by using a suitable histological stain that allows tissue differentiation, or allows specific regions to be identified, a localised analysis can then be performed for the regions of interest (potentially avoiding the need to analyse or profile the entire tissue sample). For example, in embodiments, the analysis can be directed only to the regions of interest (so that the step of generating analyte material from the one or more regions of interest identified based on the tissue stain using a direct surface sampling technique comprises generating analyte material only from the one or more regions of interest).

The (any) regions of interest that are identified based on the tissue stain may then be directly sampled using a suitable direct surface sampling technique. A direct surface sampling technique allows analyte material to be generated directly from the surface of the sample, e.g. without requiring significant sample preparation such as the addition of a matrix which may otherwise interact with the tissue stain and potentially disrupt the mass and/or ion mobility analysis.

The use of direct surface sampling techniques for analysing stained tissue samples may thus provide a highly useful analysis technique, which may e.g. be capable of more rapidly identifying and analysing regions of interest within a tissue sample without compromising the molecular information from the mass and/or ion mobility analysis. The use of such direct surface sampling techniques also allows the analysis to be directed more specifically onto the regions of interest, so that longer acquisition times can be used for the regions of interest (to obtain richer information), whilst still allowing the overall experimental time to be reduced. That is, the combination of tissue staining with direct surface sampling may allow for rapid and targeted analysis of a tissue sample that, at least in some embodiments, lends itself to automation.

In general, any suitable and desired direct surface sampling technique may be used for the techniques presented herein. For instance, in embodiments, the direct surface sampling technique may suitably comprise a desorption process such as desorption electrospray ionisation ("DESI"), a DESI-derived process, including nano-DESI, or laser desorption ionisation ("LDI"). In other embodiments, the direct surface sampling technique may comprise a laser ablation or rapid evaporative ionisation process.

The step of generating analyte material using a direct surface sampling technique may generally comprise probing the surface of the sample using a first device (or sampling probe). The first device may, for example, be configured to direct energy, or a suitable ionising medium (e.g. solvent), towards a region (sampling spot) on the surface of the sample to cause analyte material to be generated from that region. As another example, the first device may be configured to perform micro-liquid extraction on a region on the surface of the sample to cause analyte material to be generated from that region.

The analyte material may be generated in the form of e.g. smoke, vapour or aerosol. The generated analyte material may contain a mixture of ions and neutrals. In some cases, the analyte material may be analysed directly by mass and/or ion mobility analysis. However, more often, the analyte material may be subject to further or secondary ionisation, e.g. in a source region of the ion analysis instrument.

The analyte material may generally be transferred towards the inlet of the mass and/or ion mobility spectrometer using suitable transfer tubing. In some embodiments, although not essential, the transfer tubing or at least a portion thereof may be heated.

In embodiments, the method may comprise automatically identifying one or more regions of interest from the stained tissue sample. For example, identifying one or more regions of interest within the stained tissue sample based on the tissue staining may comprise obtaining an image of the stained tissue sample, and processing the image using an algorithm to identify one or more regions of interest.

The image may be obtained using any suitable image capture device such as a camera.

The image may be a standard (e.g. RGB) image. However, in embodiments, the image capture device may perform hyperspectral imaging targeted on one or more specific wavelengths of interest (e.g. based on the tissue stain). The image may also be processed (filtered) based on the tissue stain. For example, where a 'blue' tissue stain (such as toluidine blue) is used, the blue channel of the image may be analysed.

The obtained image may then be processed using suitable image processing techniques in order to (automatically) identify one or more regions of interest. For example, this may typically involve segmenting the image and/or identifying objects (or object boundaries) within the image to identify regions of interest. The one or more regions of interest may thus be identified using an image segmentation and/or object identification algorithm. It will be appreciated that various suitable image processing techniques may be used. In embodiments, machine learning algorithms may be used to process the images. That is, in embodiments, the one or more regions of interest may be identified using a machine learning algorithm.

So, the identification of the regions of interest, and hence the analysis, can be highly automated. For instance, the step of automatically identifying regions of interest may be performed using a suitable processor (e.g. computer) and/or suitable software. The step may thus be computer-implemented.

In principle, any suitably mass and/or ion mobility spectrometry compatible tissue stain (e.g. dye) that allows for some tissue differentiation (for example, between normal and 'non-normal' tissue) may be used for staining the tissue sample. For instance, the tissue stain should be selected so as to be compatible with mass and/or ion mobility spectrometry and, particularly, so that the molecular information obtained from the sample is not significantly changed by the staining. That is, the tissue stain should be selected to avoid significantly altering the surface chemistry of the tissue sample. Various examples of suitable mass and/or ion mobility spectrometry compatible tissue stains will be apparent to those skilled in the art.

However, it has been recognised that the use of direct surface sampling techniques may open up a wider range of tissue stains that can suitably be used (as there is a reduced possibility for the tissue stain to interfere with the generation of analyte material, e.g. as may be the case when using matrix-assisted techniques).

In embodiments, the tissue stain may be an aqueous based tissue stain. For instance, it has been found that aqueous based tissue stains do not generally cause the removal or relocation of lipids (which are not water soluble) on the surface of the sample. Thus, the (lipid) species of interest may be substantially unaffected by the aqueous based tissue stain. On the other hand, aqueous based tissue stains may help to remove certain salts, or other water-soluble impurities, from the surface, potentially improving the signal.

For example, in embodiments, the tissue stain may be selected from the group comprising: (i) toluidine blue; (ii) methylene blue; (iii) cresyl violet; and (iv) nuclear fast red. These tissue stains have been found to be particularly compatible with the present techniques.

Many tissue stains (dyes) contain positive ions. For instance, of the stains mentioned above, toluidine blue, methylene blue and cresyl violet all typically exist as pre-charged positive ions. In that case, to avoid seeing too large a signal from the tissue stain itself, the mass and/or ion mobility spectrometer may be operated in negative ion mode. Because these stains exist as pre-charged positive ions, they do not typically interfere with the (e.g.) [M-H]– ion formation of the (e.g. lipid) compounds of interest for the negative ion mode experiments. For negative ion mode experiments, toluidine blue in particular has been found to provide good results with the resulting spectral (imaging) data showing very little deviation compared to unstained tissues. On the other hand, nuclear fast red typically exists as a pre-charged negative ion, and shows a larger deviation compared to unstained tissues (at least for negative ion mode experiments).

In some cases, depending on the tissue stain that is being applied, the mass and/or ion mobility spectrometer may also be operated in positive ion mode. For example, because nuclear fast red typically exists as a pre-charged negative ion, there may be reduced interference from the ions of the stain when operating in positive ion mode.

Thus, in embodiments the mass and/or ion mobility spectrometer may be selectively operated in either negative ion mode or positive ion mode depending on the tissue stain that has been applied. In particular, the mass and/or ion mobility spectrometer may be operated in negative ion mode to obtain negative ion spectra when the tissue stain (primarily) exists as a positive ion. On the other hand, when the tissue stain (primarily) exists as a negative ion, the mass and/or ion mobility spectrometer may be operated in positive ion mode to obtain positive ion spectra.

In some cases the mass and/or ion mobility spectrometer may be switched between positive and negative ion modes.

The tissue sample may comprise a tissue section mounted on a glass slide. The method may further comprise automatically preparing and/or loading the tissue section onto a sample mounting stage of an analysis system. For example, this step may be performed using a microtome.

In embodiments the method may comprise a method of imaging a tissue sample. Accordingly, from another aspect there is provided a method of imaging a tissue sample comprising a method substantially as described herein. The method may thus comprise generating analyte material from a plurality of different regions of the tissue sample, analysing the generated analyte material using the mass and/or ion mobility spectrometer, and mapping the results of the mass and/or ion mobility analysis for the analyte material to the location of the region of the tissue sample from which the analyte material was generated. In this way, a 'map' or image of the tissue sample may be generated.

The tissue sample may be analysed to look for a characteristic negative ion phospholipid profile. Thus, from still another aspect there is provided a method of classifying a tissue sample comprising a method substantially as described herein, wherein the tissue sample is classified based on a negative ion phospholipid profile. Thus, the method may involve obtaining a negative ion phospholipid profile for one or more regions of interest of the tissue sample, and using the obtained negative ion phospholipid profiles to classify the tissue sample, e.g. by comparing the obtained negative ion phospholipid profiles with a library. It has been found that the combinations of direct surface sampling and tissue staining as described herein may particularly be capable of generating useful negative ion phospholipid profiles as these species can be analysed without the tissue stain significantly interfering with either the generation of analyte ions on the sample surface or the mass and/or ion mobility analysis.

The methods described herein may be performed on a tissue sample that has already (previously) been stained. However, in embodiments, the method may further comprise a prior step of applying a tissue stain to a sample. Thus, according to another aspect, there is provided a method of analysing a tissue sample comprising: applying a tissue stain to a sample; identifying one or more regions of interest within the stained tissue sample based on the tissue staining; generating analyte material from the one or more regions of interest using a direct surface sampling technique; receiving the generated analyte material at a sampling inlet; and passing the analyte material towards a mass and/or ion mobility spectrometer for analysis. Optionally, after the applying the tissue stain, the sample may be washed to remove excess tissue stain (to ensure reproducibility). For example, the sample may typically be briefly dipped into water to wash away excess tissue stain.

From a further aspect there is provided an analysis system comprising:
- a sample mounting stage for receiving a tissue sample to be analysed;
- a first device for generating analyte material from the tissue sample using a direct surface sampling technique;
- a sampling inlet for receiving the generated analyte material;
- a mass and/or ion mobility spectrometer for analysing the generated analyte material;
- transfer tubing for passing the analyte material towards the mass and/or ion mobility spectrometer for analysis;
- an image capture device such as a camera for obtaining an image of a tissue sample on the sample mounting stage; and
- a controller configured to:
- automatically process an image of a tissue sample on the sample mounting stage to which a tissue stain has been applied to identify one or more regions of interest; and
- direct the first device to generate analyte material from the identified region(s) of interest of the stained tissue sample.

Thus, in embodiments, there is provided an analysis system that is able to automatically identify regions of interest within a tissue sample that is currently mounted on the sample mounting stage and then direct the analysis to generate analyte material from the identified region(s) of interest.

For instance, a stained tissue sample may be loaded onto the sample mounting stage and an image of the stained tissue sample on the sample mounting stage can then be obtained and processed to identify regions of interest.

In particular, the controller may comprise one or more processor(s) such as an image processor, or software such as image processing software, that is configured to process images of stained tissue samples to identify one or more regions of interest (e.g. in the manner described herein). The controller may further comprise control circuitry, or software, for moving the first device relative to the tissue sample on the sampling mounting stage to generate analyte material from the identified region(s) of interest. (For instance, either the first device may be moved over the surface of the sample and/or the sample mounting stage may be moveable underneath the first device.)

The analysis may thus be targeted to the region(s) of interest based on the processing of the image of the stained tissue sample.

In embodiments, the tissue sample comprises a tissue section. In this case, the system may further comprise an automated sample preparation and loading device for automatically preparing a tissue section to be analysed and loading the tissue section onto the sample mounting stage for analysis. The automated sample preparation and loading device may comprise a microtome.

The first device may comprise a DESI sprayer or a laser desorption ionisation device. In other embodiments, the first device may comprise a laser ablation or rapid evaporate ionisation probe. In general, the first device may comprise any suitable direct surface sampling probe.

The processor may comprise an image segmentation and/or object classification algorithm for automatically processing the image to identify the one or more regions of interest. In embodiments, a machine learning algorithm may be used.

It will be appreciated that the methods and systems according to these further aspects may generally comprise any, or all, of the features described above in relation to the first aspect in any of its embodiments, at least to the extent that they are not mutually exclusive. For instance, the system may further comprise suitable processing means (whether implemented in hardware or software) configured to perform any of the method steps described herein.

BRIEF DESCRIPTION OF THE DRAWINGS

Various embodiments will now be described, by way of example only, and with reference to the accompanying drawings in which:

FIGS. 2A & 2B present a comparison of the results of a DESI-MS imaging experiment on an unstained tissue sample and a tissue sample that has been stained using an aqueous solution of toluidine blue;

DESCRIPTION

Figure 1:
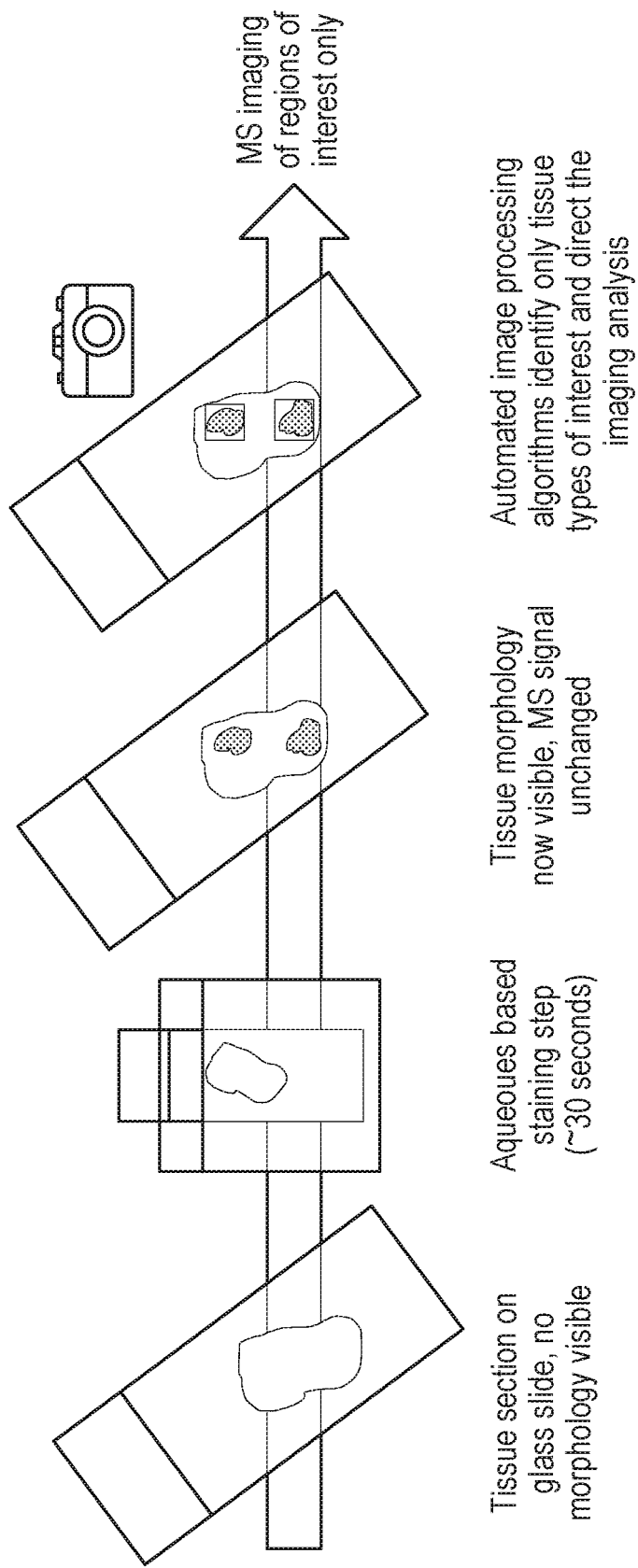
FIG. 1 schematically shows an example of an analysis workflow according to embodiments.

Tissue samples are normally analysed by histological examination of thin tissue sections wherein a slice of tissue to be analysed is prepared, e.g. using a microtome, and mounted onto a glass slide ready for analysis. The morphology of the tissue for such tissue sections is typically very difficult to visualise. Accordingly, in order to better visualise the morphology of the tissue, e.g. to allow different regions to be identified, it is known to stain the tissue section. Various suitable examples of tissue stains (e.g. dyes) are known for staining different cellular components, e.g. depending on the desired application and/or compounds of interest. For instance, one commonly used staining system involves haematoxylin and eosin ("H&E").

Ion analysis techniques such as mass and/or ion mobility spectrometry can provide further detailed insight on the nature of the tissue section. For instance, such techniques typically involve probing the surface of the tissue section in order to generate analyte material from one or regions of the tissue section. The analyte material may contain ions which can be directly passed to the ion analysis instrument or may be subject to further ionisation within a source region of the ion analysis instrument. By analysing ions from different regions of the tissue section, and recording the locations on the tissue section from where the ions were obtained, a 'map' of the tissue section can thus be obtained. Such mapping techniques are often referred to as 'imaging' (or profiling) experiments.

Often a mapping of the whole tissue section is not required as only certain regions (e.g. 'non-normal' regions) will be of interest. Thus, as mentioned above, it may be desirable to stain the tissue to allow differentiation between the regions of the tissue in order to help guide the ion analysis. However, it has been found that many tissue stains are not very compatible with such ion analysis techniques. For instance, it has been found that many tissue stains commonly used for histology interfere with the tissue that is being analysed in such a manner that may negate the subsequent ion analysis. For example, and especially for non-aqueous based stains, the solvent may alter the chemistry of the sample and/or disrupt and delocalise species on the surface of the tissue sample. In this case, the mapping may be essentially meaningless as the results of the ion analysis may no longer accurately reflect the actual morphology of the tissue sample surface. It has also been found that many tissue stains can interfere with the ion analysis, e.g. depending on the sampling technique used to generate the analyte material. Similarly, in some cases, the tissue stain itself may give rise to a large ion signal that may interfere with and potentially mask the ion signals from the compounds of interest.

Despite this, some mass spectrometry compatible tissue stains have been identified. For instance, in the paper "Integrating Histology and Imaging Mass Spectrometry" of Chaurand et al., *Analytical Chemistry*, Vol. 76, No. 4, Feb. 15, 2004, some success was found by integrating matrix-assisted laser desorption/ionisation ("MALDI") mass spectrometry with various mass spectrometry friendly tissue staining protocols. However, depending on the staining protocol, it was still found that the intensities of some of the signals were significantly affected with the stained tissue samples displaying strong variations with respect to the control trace (i.e. a similar tissue sample without staining).

Thus, according to embodiments, a tissue sample is first stained and a direct surface sampling technique such as desorption electrospray ionisation ("DESI") or laser ablation is then used to analyse the stained tissue sample. It will be understood that a "direct" surface sampling technique is a method that is capable of directly generating analyte material from the surface of a sample, e.g. without requiring the addition of a matrix to prepare the sample, typically under ambient conditions. Various examples of such direct surface sampling techniques are known and in principle the present techniques may be extended to any suitable such techniques.

The use of such direct surface sampling techniques may generally be advantageous (e.g. compared to known MALDI techniques such as that described in the paper of Chaurand et al.) as they typically allow a much faster analysis due to the possibility to analyse tissue samples in their native or unmodified form, e.g. without significant sample preparation.

Furthermore, it has also now been found that the use of such direct surface sampling techniques may be particularly advantageous when combined with suitable tissue staining protocols as part of a tissue analysis (or imaging) experiment.

For instance, when using a tissue stain such as toluidine blue (or similar, see later) in combination with typical positive ion MALDI mass spectrometry, as described in the paper of Chaurand et al., there may be a relatively large interference signal from the tissue stain (which often contains positive ions). However, the Applicants have now discovered that the negative ion spectra may be substantially unaltered. Thus, by using a direct surface sampling technique to analyse the stained tissue sample, negative ion spectra may suitably be obtained and better (e.g. more accurate) results achieved. There are also various other and more fundamentally significant considerations when using MALDI techniques resulting from interactions between the matrix, the tissue stain (dye) and the analyte molecules. For instance, with MALDI, the tissue sample must first be sprayed with a solvent containing the matrix (which is generally a small molecule that absorbs the wavelength of the laser) with the aim that the molecules of interest are extracted from the tissue and are present within crystals of matrix material that form as the solvent evaporates. Anything that disrupts this process, such as the presence of the tissue stain, can thus alter the resulting ion signal. Again, according to embodiments, these issues can be avoided by using a direct surface sampling technique such as DESI or laser ablation. Thus, there may be a particular synergy in using direct surface sampling techniques in combination with tissue staining protocols.

Furthermore, according to embodiments, a virtual dissection of the tissue section can be made based on the staining, with the ion analysis only being performed on the regions of interest, thus increasing throughput and minimising data burden. An example of this approach would be using the stain to detect regions of 'non-normal' breast tissue within a biopsy, with only those regions identified based on the staining as being 'non-normal' being analysed and then classified, e.g. against a tissue identification database (e.g. using the negative ion phospholipid profile of the region of tissue). For instance, in embodiments, an image segmentation step may be performed on an image of the stained tissue to automatically identify one or more regions of interest. The ion analysis can then be directed appropriately, e.g. to only analyse the regions of interest. It will be appreciated that since the tissue profile is unchanged by the staining, it doesn't matter if the database used to classify the tissue sample was collected on stained or unstained tissues (or a mixture of both).

FIG. 1 schematically shows an example analysis workflow according to embodiments. As shown, a tissue section is provided on a glass slide. The tissue section may generally be provided using any suitable technique, as desired. For example, typically, the tissue section may be prepared by slicing a tissue sample using a microtome and then mounting the tissue slice on a glass slide. Because the tissue section comprises only a thin slice of tissue, the tissue morphology is not easily visible. A step of aqueous based tissue staining is thus performed, e.g. by immersing the tissue section into a staining dye. In general any suitable tissue staining protocols may be used, e.g. depending on the sample being analysed and the application. The tissue stain is generally selected to be compatible with the subsequent ion analysis, e.g. so that the resulting mass spectrometric signal from the tissue is substantially unchanged by the staining protocol. Various examples of suitable compatible tissue stains will be described later.

Following the tissue staining, the tissue morphology can now be visualised. Ion analysis such as mass spectrometry can thus be performed on the regions of interest (only), e.g.

as determined from the staining. For instance, in embodiments, an image of the stained sample can be taken and automated image processing algorithms may be used to identify tissue types of interest based on the staining and thus direct the ion analysis. In this way, the regions of interest may be automatically identified and analysed in order to map the regions of interest.

Figure 2A:
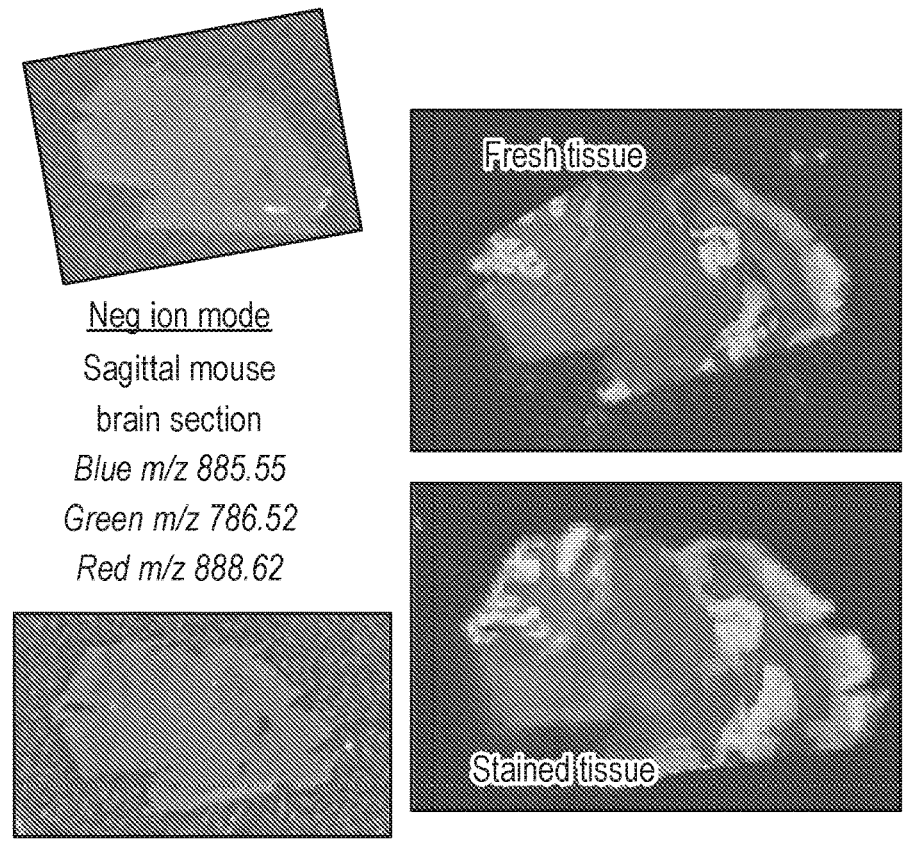
Figure 2A:
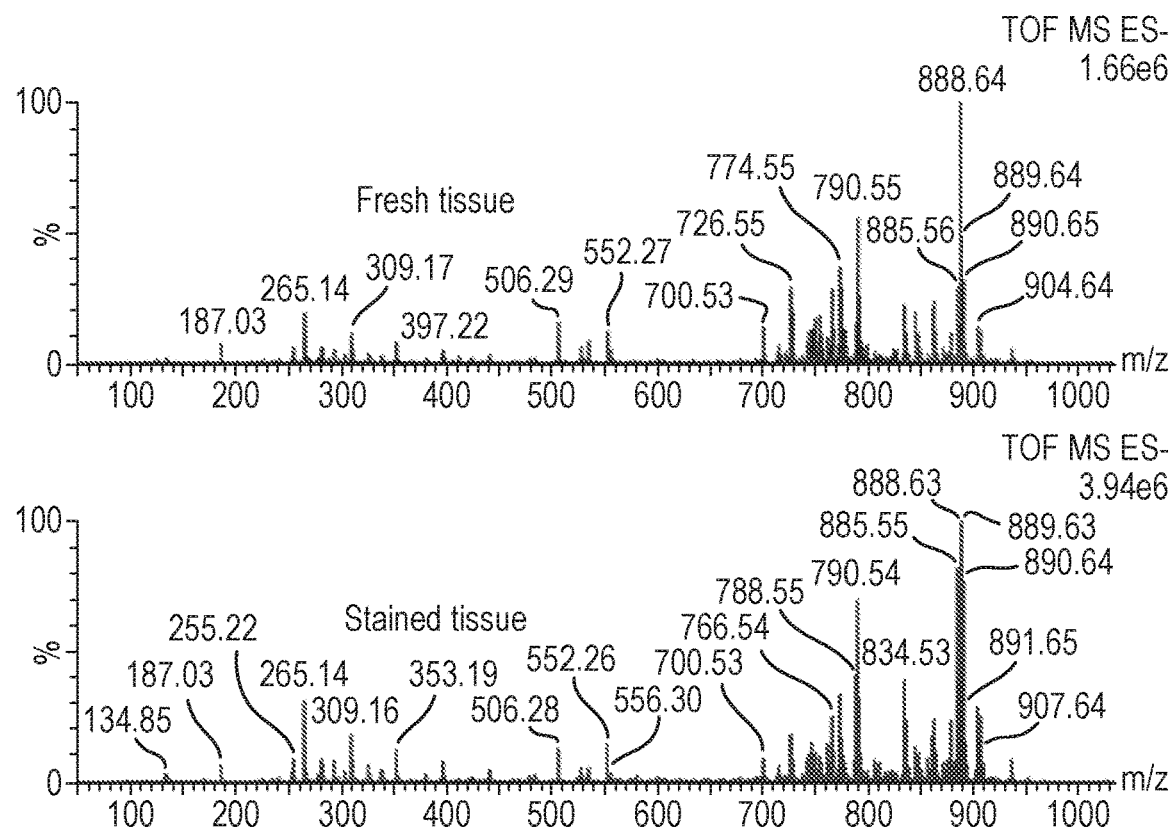

FIGS. 2A & 2B shows an example of results obtained using this workflow. In particular, FIG. 2A shows the results of a mass spectrometry imaging analysis performed on a tissue section of sagittal mouse brain. The upper panel ('fresh tissue') shows the results for a control sample of unstained tissue sample whereas the lower panel ('stained tissue') shows the results for a tissue section after staining with an aqueous solution of toluidine blue. In this example, the tissue sections are analysed using negative ion DESI mass spectrometry. As can be seen, the pixel-by-pixel spectra from the tissues are almost identical between the stained and unstained tissue. It can also be seen that there is no visible delocalisation of molecules within the tissue as the mass spectrometry images are highly comparable between the stained and unstained tissues. FIG. 2B is a PCA plot demonstrating that the separation in tissue difference is far more significant than the differences between the stained and unstained tissue samples. It is apparent from FIG. 2B that mass spectra can be obtained from toluidine blue stained tissue with only small differences between the stained and unstained mass spectra.

Figure 3:
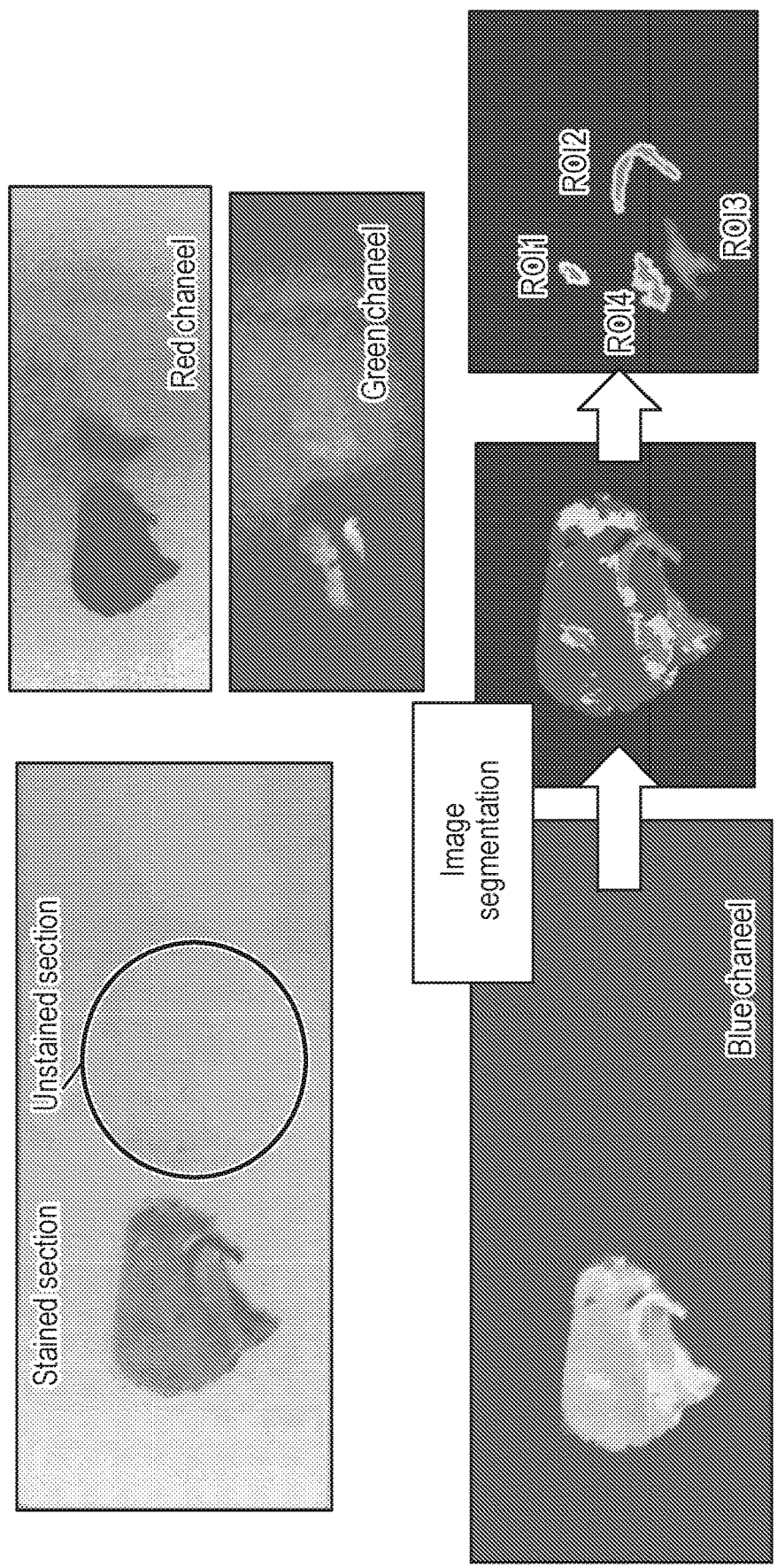
FIG. 3 illustrates an example of an image processing workflow that may be used according to embodiments.

FIG. 3 illustrates an example of an image processing workflow that may be used in embodiments wherein an optical image of the tissue section is taken by a camera mounted above the sample mounting stage and the image is then processed in order to identify one or more regions of interest. Here, the tissue stain is toluidine blue. Thus, by considering the 'blue' channel of the image, the morphology of the tissue becomes more readily visible and the image can thus be suitably segmented, e.g. using a suitable image segmentation (and/or object identification) algorithm. For instance, in embodiments, various machine learning approaches may be applied for segmenting the image and identifying one or more regions of interest. In this way, by incorporating an inline optical scan with image processing, segmentation and object defining steps, the tissue staining can be used to automatically target specific tissue regions for subsequent imaging or profiling, thus reducing acquisition times and data sizes. In the example shown in FIG. 3 the camera is used to obtain a standard RGB image. However, in other embodiments, it is also contemplated that instead of obtaining standard RGB images, this could be replaced with hyperspectral imaging, e.g. targeting specific absorption wavelengths of the dye or tissue components.

The image processing may generally involve creating a grayscale map of the image (or a selected, e.g. 'blue', channel of the image) which can subsequently be processed into a binary map using various suitable object detection and thresholding techniques, as desired. These maps may then be further processed with steps such as hole filling, edge detection and the rejection of objects below a predetermined size cut off. The result of these steps is thus a map showing potential regions of interest to which the subsequent ion analysis can be directed. An example image processing technique is illustrated in FIG. 4 which illustrates the creation of a co-ordinate map for use in imaging mass spectrometry from an optical image of a microscope slide containing tissue sections.

Figure 4:
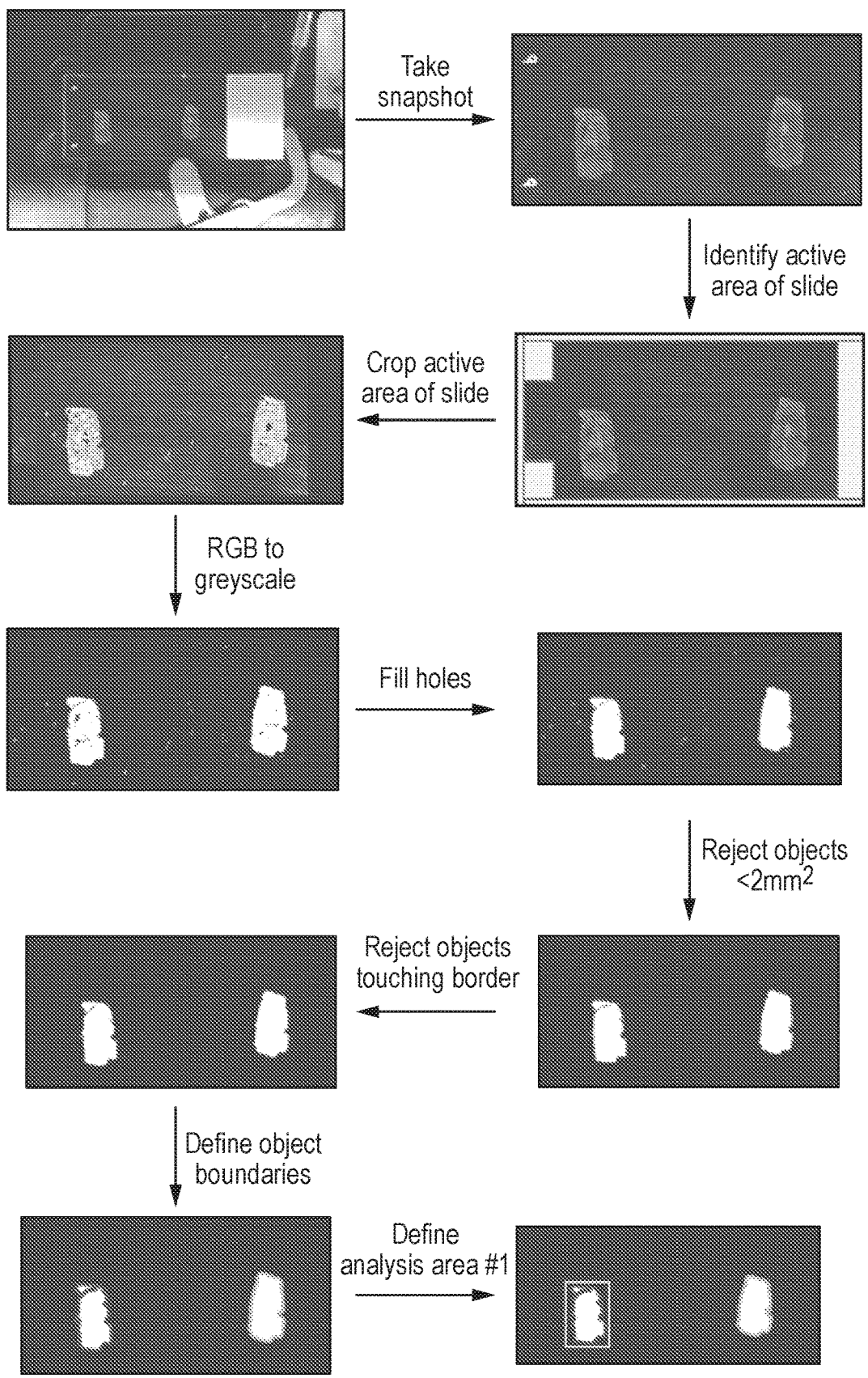
FIG. 4 illustrates an example of how an image may be processed according to embodiments.

As shown in FIG. 4, an image of the tissue section is obtained. The image may then be cropped to show only the active area of the slide. As part of this, possible regions of interference such as edges, text or corner markers may be removed from the image. The RGB image is then converted to greyscale by a process of automatic binary thresholding to create a binary map. Any holes in the images may then be filled and any objects falling below a certain size threshold (e.g. less than 2 mm$^2$) or touching a border can be rejected. The object boundaries and analysis areas can then be defined appropriately. Although the example in FIG. 4 shows the detection of a whole tissue section, it will be appreciated that the processing steps are generally the same as if the stains were used as a virtual dissection of the tissue, i.e. if the image is processed to identify one or more sub-regions of interest within the tissue section.

The image processing may be performed using various suitable image processing and segmentation algorithms, as desired, and e.g. depending on the tissue section being analysed and the staining protocol used. Typically, the image processing may be performed using a suitably trained machine learning algorithm. For example, in embodiments, and in the example shown in FIG. 3, the segmentation may be performed using k-means factorisation, optionally with suitable object and boundary finding algorithms deployed on the factor output to define the regions of interest, i.e. the regions to be analysed. However, it will be appreciated that various other suitable algorithms may be used for processing the images to identify one or more regions of interest.

The position of the regions identified in this way can then be stored and/or sent to an acquisition method file of an ion analysis instrument to begin automated analysis of the tissue section, either in imaging or profiling mode. It will be appreciated that such a workflow may be of particularly utility when coupled to automated sample slide preparation and loading devices (e.g. including a microtome).

For instance, ultimately, the techniques disclosed herein may find great applicability within automated tissue sampling systems such as mass spectrometry based histology. Previous systems have been detailed and outlined where hundreds of samples can be stored and analysed as large batches without user intervention. Using the techniques presented herein, the throughput may be increased even further as only the tissue regions that are identified as being relevant can be selected for imaging or profiling, rather than having to image the whole tissue section.

Figure 5:
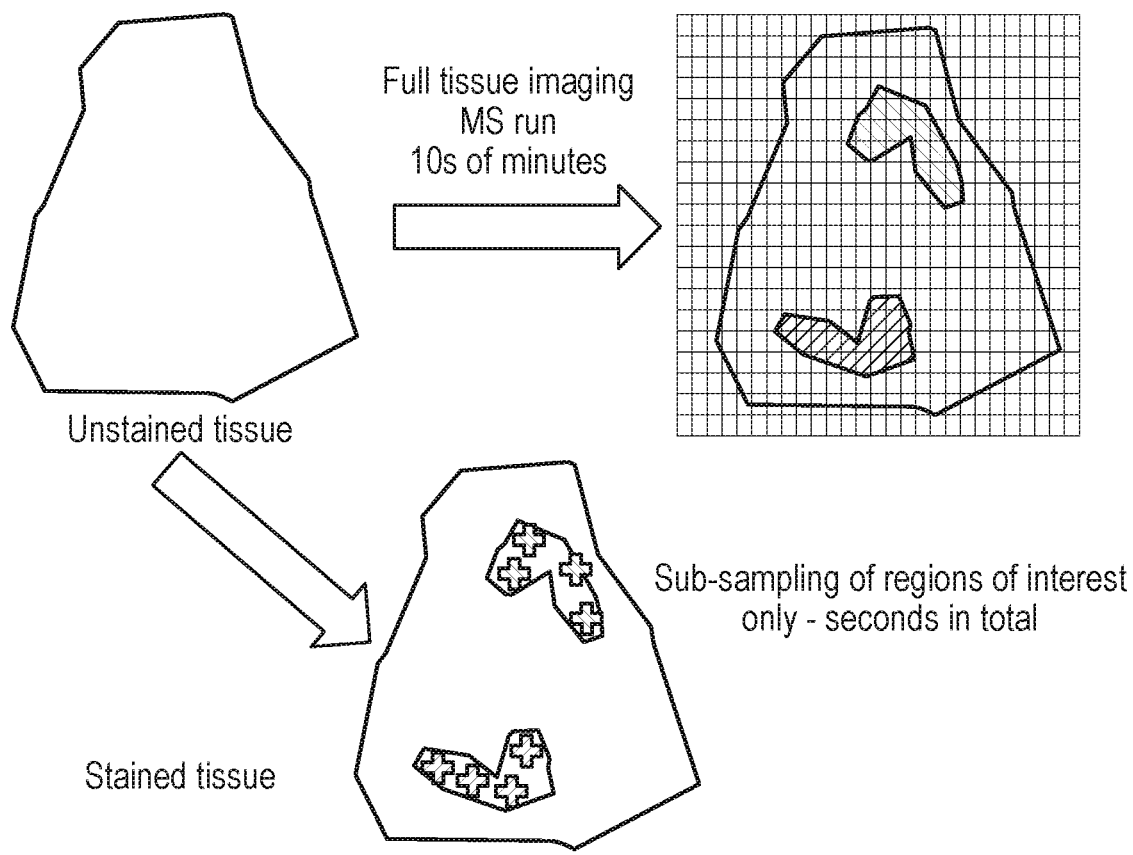
FIG. 5 illustrates an increased throughput that may be provided according to embodiments.

FIG. 5 illustrates the improved throughput that may be achievable according to embodiments. For example, without tissue staining, a full tissue mass spectrometry imaging run may take tens of minutes. However, by staining the tissue, and then sampling the tissue section only in regions of interest, the time taken for the imaging process may be significantly reduced (e.g. to a matter of seconds). Thus, by using suitable tissue stains to direct a profiling experiment the same information can be obtained as from a full imaging experiment but in a fraction of the time.

Various examples have been described above in relation to DESI. The DESI technique is described for instance in R. G. Crooks et al. "Mass Spectrometry Sampling Under Ambient Conditions with Desorption Electrospray 30 Ionisation", *Science,* 2004, 306, 471-473. Some examples of related techniques derived from DESI that may also be suitably be used in accordance with various embodiments are described in a survey article "Ambient Mass Spectrometry", *Science,* 2006, 311, 1566-1570. DESI is also described in various patents and patent publications including U.S. Pat. No. 7,847,244 (PURDUE RESEARCH FOUNDATION), U.S. Pat. No. 8,203,117 (PROSOLIA, INC.) and U.S. Pat. No. 7,335,897 (PURDUE RESEARCH FOUNDATION).

The DESI technique allows for ambient ionisation of a trace sample at atmospheric pressure with little (or no) sample preparation. In these embodiments, where the sprayer device comprises a DESI (or similar) sprayer device, a spray of (primary) electrically charged droplets may be directed onto the surface of the sample. Subsequent ejected (e.g. splashed) (secondary) droplets may carry desorbed ionised analytes (e.g. desorbed lipid ions).

Thus, as described above, the sprayer device may be supplied with a solvent, a nebulising gas such as nitrogen, and a voltage from a voltage source. The solvent may be supplied to a central spray capillary of the sprayer, and the nebulising gas may be supplied to a second capillary that may (at least partially) coaxially surround the central capillary. The arrangement of the capillaries, the flow rate of the solvent and/or the flow rate of the gas may be configured such that solvent droplets are ejected from the sprayer. The high voltage may be applied to the central spray capillary, e.g. such that the ejected solvent droplets are charged. Suitable connectors may therefore be provided on the housing allowing connections to be made to one or more of: (i) an electrical power supply; (ii) a supply of solvent gas; and (iii) a supply of nebulising gas;

The charged droplets may be directed at the sample such that subsequent ejected (secondary) droplets carry desorbed analyte ions. The ions may travel into an atmospheric pressure interface of an analytical instrument such as a mass and/or ion mobility spectrometer, e.g. via a transfer capillary.

According to the DESI technique a spray of charged droplets is directed towards the sample. However, in other embodiments where a sprayer device is used, the spray droplets need not be charged. For example, the sprayer device may alternatively (or additionally) be configured to perform sonic spray ionisation. In this case, the sprayer device may be supplied with a solvent and nebulising gas but a voltage source may not be required.

Although various examples have been described above in relation to DESI-MS, it will be appreciated that the present disclosure is not limited to DESI (or DESI derived sampling methods) and other direct surface sampling methods may suitably be used. For example, in embodiments, the surface of the sample may be directly probed using a laser probe such as in a laser ablation or laser desorption ionisation sampling method.

In general, any suitable and desired direct surface sampling technique may be used. For example, it is contemplated that analyte material may be generated directly from the surface of the sample using a sampling probe that comprises any of: (i) a rapid evaporative ionisation mass spectrometry ("REIMS") ion source; (ii) a desorption electrospray ionisation ("DESI") ion source; (iii) a laser desorption ionisation ("LDI") ion source; (iv) a thermal desorption ion source; (v) a laser diode thermal desorption ("LDTD") ion source; (vi) a desorption electro-flow focusing ("DEFFI") ion source; (vii) a dielectric barrier discharge ("DBD") plasma ion source; (viii) an Atmospheric Solids Analysis Probe ("ASAP") ion source; (ix) an ultrasonic assisted spray ionisation ion source; (x) an easy ambient sonic-spray ionisation ("EASI") ion source; (xi) a desorption atmospheric pressure photoionisation ("DAPPI") ion source; (xii) a paperspray ("PS") ion source; (xiii) a jet desorption ionisation ("JeDI") ion source; (xiv) a touch spray ("TS") ion source; (xv) a nano-DESI ion source; (xvi) a laser ablation electrospray ("LAESI") ion source; (xvii) a direct analysis in real time ("DART") ion source; (xviii) a probe electrospray ionisation ("PESI") ion source; (xix) a solid-probe assisted electrospray ionisation ("SPA-ESI") ion source; (xx) a cavitron ultrasonic surgical aspirator ("CUSA") device; (xxi) a focused or unfocussed ultrasonic ablation device; (xxii) a microwave resonance device; (xxiii) a pulsed plasma RF dissection device; (xxiv) a liquid extraction surface analysis ("LESA") device.

Figure 6:
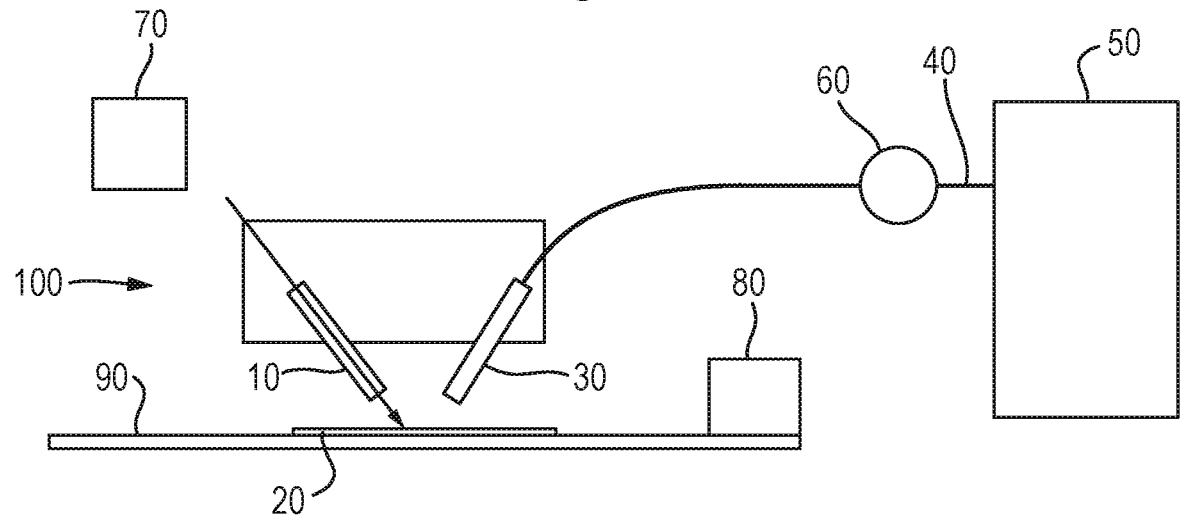
FIG. 6 shows schematically an example of a direct surface sampling system that may be used according to embodiments.

FIG. 6 shows schematically an example of a suitable direct surface sampling system 100 that may be used according to embodiments. The system shown in FIG. 6 comprises an ambient ionisation sampling probe 10 that is used to direct energy onto the surface of a tissue section 20 in order to generate analyte material, e.g. in the form of smoke, vapour or aerosol. As mentioned above, the sampling probe 10 may suitably comprise a DESI probe. However, other arrangements are of course possible and in embodiments the sampling probe 10 may comprise, among other suitable examples, a laser desorption or laser ablation probe. Whatever sampling probe 10 is used to probe the tissue section 20, the analyte material that is generated is then received by a suitable collection or sampling inlet 30 and transported towards the inlet 40 of an ion analysis instrument such as a mass spectrometer 50. Optionally, as shown in FIG. 6, an organic solvent such as isopropanol may be added to the analyte material liberated from the surface of the sample prior to the inlet 40 of the instrument 50. This may be done by a suitable solvent dosing device 60. However, it will be understood that the addition of an organic solvent is not essential.

FIG. 6 also shows an image capture device 70 located above the sample mounting stage 90 upon which the tissue section 20 is mounted. As described above, the image capture device 70 typically comprises a camera that may be used to obtain an image of the tissue section 20. The camera may comprise any suitable camera, e.g. depending on the tissue stain that is being applied. For instance, in embodiments, the camera is used to obtain standard RGB images. However, it is also contemplated that the camera may perform hyperspectral imaging targeted on one or more specific wavelengths of interest. The image capture device 70 may also contain image processing circuitry for processing the images in order to identify regions of interest. Alternatively, images obtained by the camera of the image capture device 70 may be passed to a suitable computer for performing the image processing. The sample mounting stage 90 upon which the tissue section 20 is mounted may generally be moveable. Thus, a suitable drive mechanism 80 may be provided for moving the sample mounting stage 90 at least in the horizontal plane. In other embodiments, the sampling probe may be moved over the sample mounting stage 90. In both cases, this allows mapping over the surface of the tissue section 20. The movement of the sample mounting stage 90 relative to the tissue section 20 (or vice versa) may generally be guided or directed based on the result of the image processing, as discussed above, so as to focus on the regions of interest.

Figure 7:
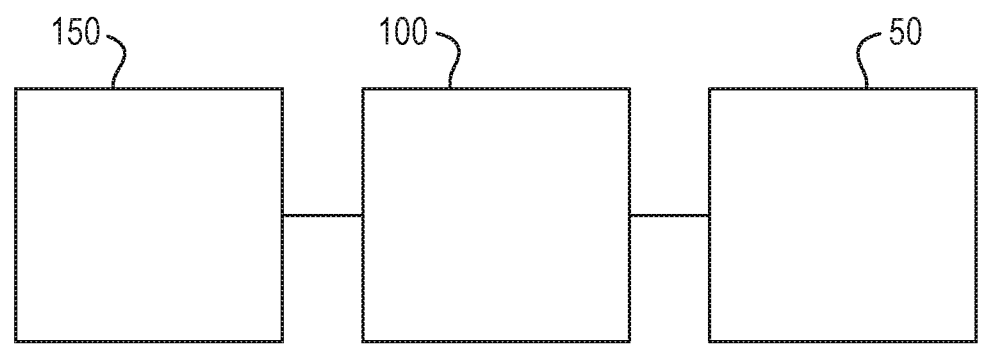
FIG. 7 shows schematically an automated analysis system according to embodiments.

FIG. 7 shows schematically an automated analysis system according to embodiments. The system generally comprises, in order, a sample slide preparation and loading device 150 which may typically comprise a microtome. The sample slides prepared by this device are then suitably mounted onto the sample stage 90 of the sampling system 100 ready for analysis. The analyte material generated by the sampling system is then transported to an ion analysis instrument such as a mass spectrometer 50 as shown in FIG. 6.

Although various examples have been described above in relation to toluidine blue, it will be appreciated that various other suitable (compatible) tissue stains may be used, as desired, e.g. depending on the application. As discussed above, the tissue stain should generally be chosen to be compatible with the ion analysis technique that is being used.

Figure 8:
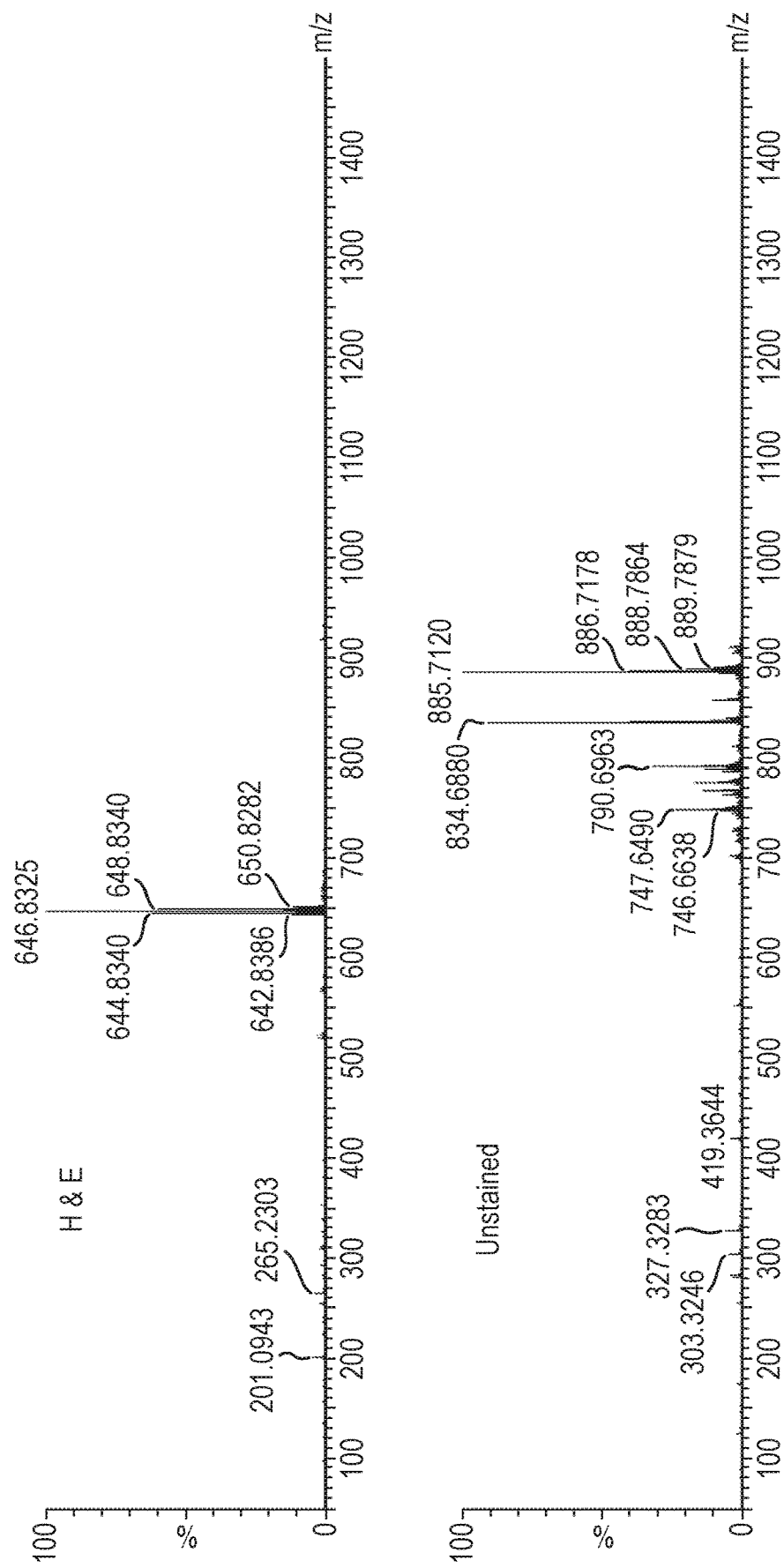
FIG. 8 shows how a conventional H&E tissue stain is incompatible with DESI-MS.

For instance, one commonly used staining protocol involves haematoxylin and eosin ("H&E"), which uses two separate dyes: haematoxylin, a basic dye that stains structure such as the nucleus a purple/blue colour, and eosin, an acidic dye staining cytoplasm material a red/pink colour. The sample preparation process when H&E is used requires a multi-step washing approach as to prepare the tissue for maximal staining that uses solvents such as xylene. However, it has been recognised that this has the effect of stripping the tissue of many molecules of interest that would be typically analysed in a DESI-MS experiment, as shown in FIG. 8. FIG. 8 shows a comparison between the total mass spectrum obtained from analysis of an H&E stained tissue (upper panel), and the corresponding total mass spectrum obtained from analysis of a corresponding tissue that has not been stained (lower panel). As can be appreciated from FIG. 8, many ions of interest, in particular complex lipids of interest in the 600-1000 m/z range, which are detected by analysis of the unstained tissue, are absent from the spectrum obtained from the H&E stained tissue. H&E is therefore incompatible with DESI-MS.

Accordingly, the tissue stain should be selected so that the tissue sample surface is not significantly altered by the staining protocol. Typically, this means that an aqueous-based tissue stain may be used. Most tissue stains contain positive ions. Thus, in embodiments, at least in that case, negative ion analysis may suitable be performed. So, in embodiments, an aqueous-based tissue stain such as toluidine blue may be used. It has been found that such tissue stains do not disrupt the mass spectrometry signal obtained during a DESI-MS experiment. In particular, the negative ion phospholipid profile often used to classify tissue is unaltered by the staining. Other examples of suitable tissue stains include, although are not limited to methylene blue, cresyl violet, and nuclear fast red. Table 1 gives a list of some typical tissue staining protocols that may be used, as well as the H&E protocol, for comparison.

TABLE 1

Tissue Staining Protocols.

| Stain | Protocol | Stain time |
| --- | --- | --- |
| H&E | Xylene wash, IMS wash (x4), Hernatoxylin Stain, Eosin Stain, Xylene wash (x3) | Hernatoxylin 3 mins Eosin 1s |
| Toluidine Blue | 1% Toluidine Blue in aqueous, dH$_2$O wash | 5-10s |
| Methylene Blue | 1% Methylene Blue in aqueous, dH$_2$O wash | 5-10s |
| Cresyl Violet | 0.5% Cresyl Violet in aqueous, dH$_2$O wash | 45s |
| Nuclear Fast Red | 0.1% in 5% aqueous aluminium sulphate, dH$_2$O wash | 60s |

Figure 9:
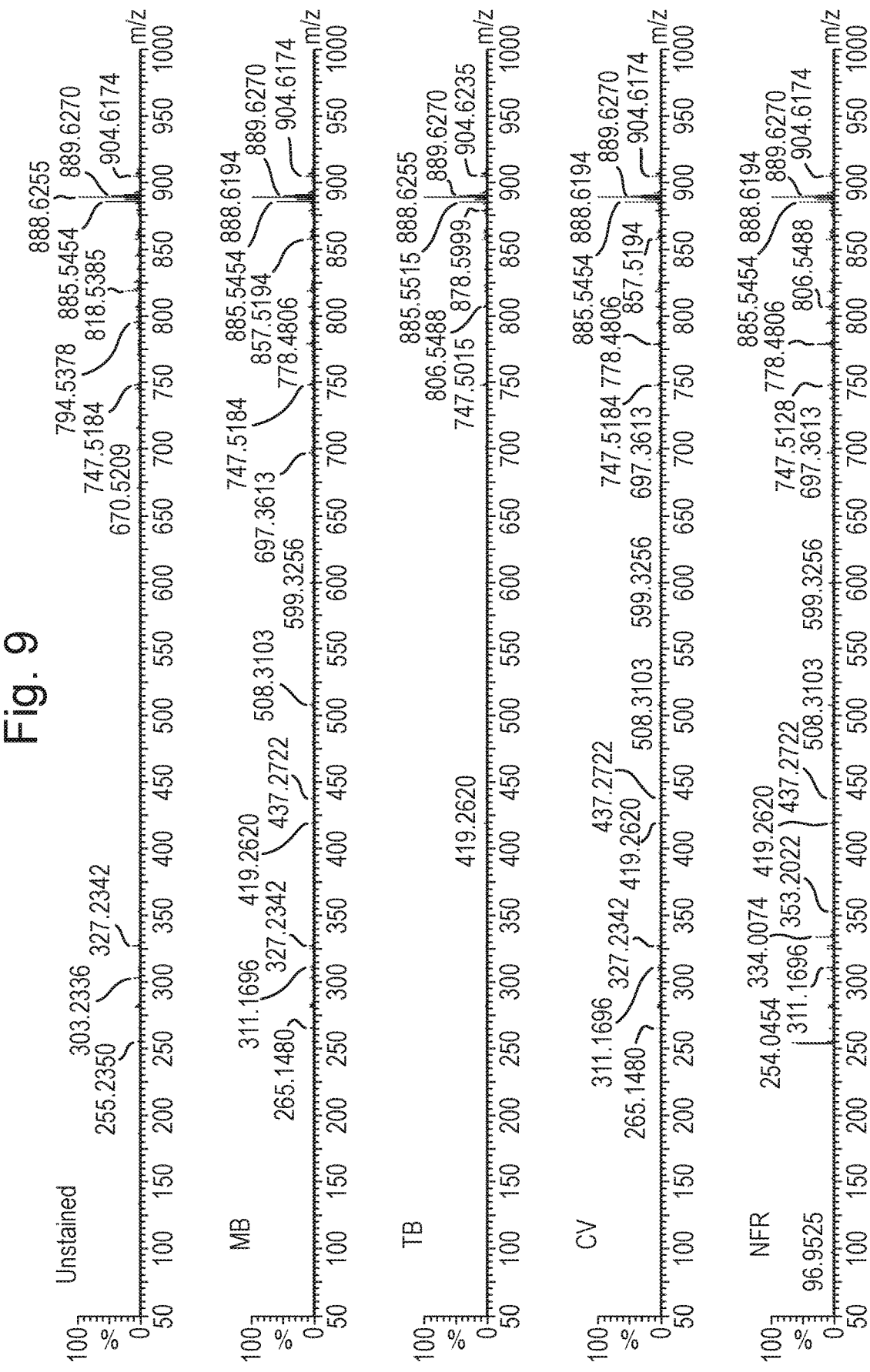
FIG. 9 shows a comparison of negative ion mode DESI-MS results between various different tissue stains.

FIG. 9 shows a comparison of the mass spectra obtained using negative ion mode DESI-MS to analyse an unstained sample, and samples that have been stained using Methylene Blue (MB), Toluidine Blue (TB), Cresyl Violet (CV), and Nuclear Fast Red (NFR), with the respective staining protocol conditions shown in Table 1. As can be appreciated from FIG. 9, the mass spectra obtained from the stained samples are similar to that obtained from the unstained sample, particularly with regard to the lipid ions of interest in the 600-1000 m/z range). As such, these stains, or dyes, may suitably be used to stain a sample without the stain causing an undesirable change in the molecular information obtained from the sample and affecting the mass spectrometry signal when the stained sample is subjected to a further mass spectrometric analysis.

It can also be seen from FIG. 9 that at least for Toluidine Blue, Methylene Blue, and Cresyl Violet, there is no signal appearing in the spectra from the dye itself. This is because these dyes exist as positively pre-charged molecules, and therefore do not appear in the negative ion spectra. Nuclear Fast Red, by contrast, exists as a negatively pre-charged molecule, and there is therefore a signal resulting from the dye in the negative ion mass spectra.

Figure 10:
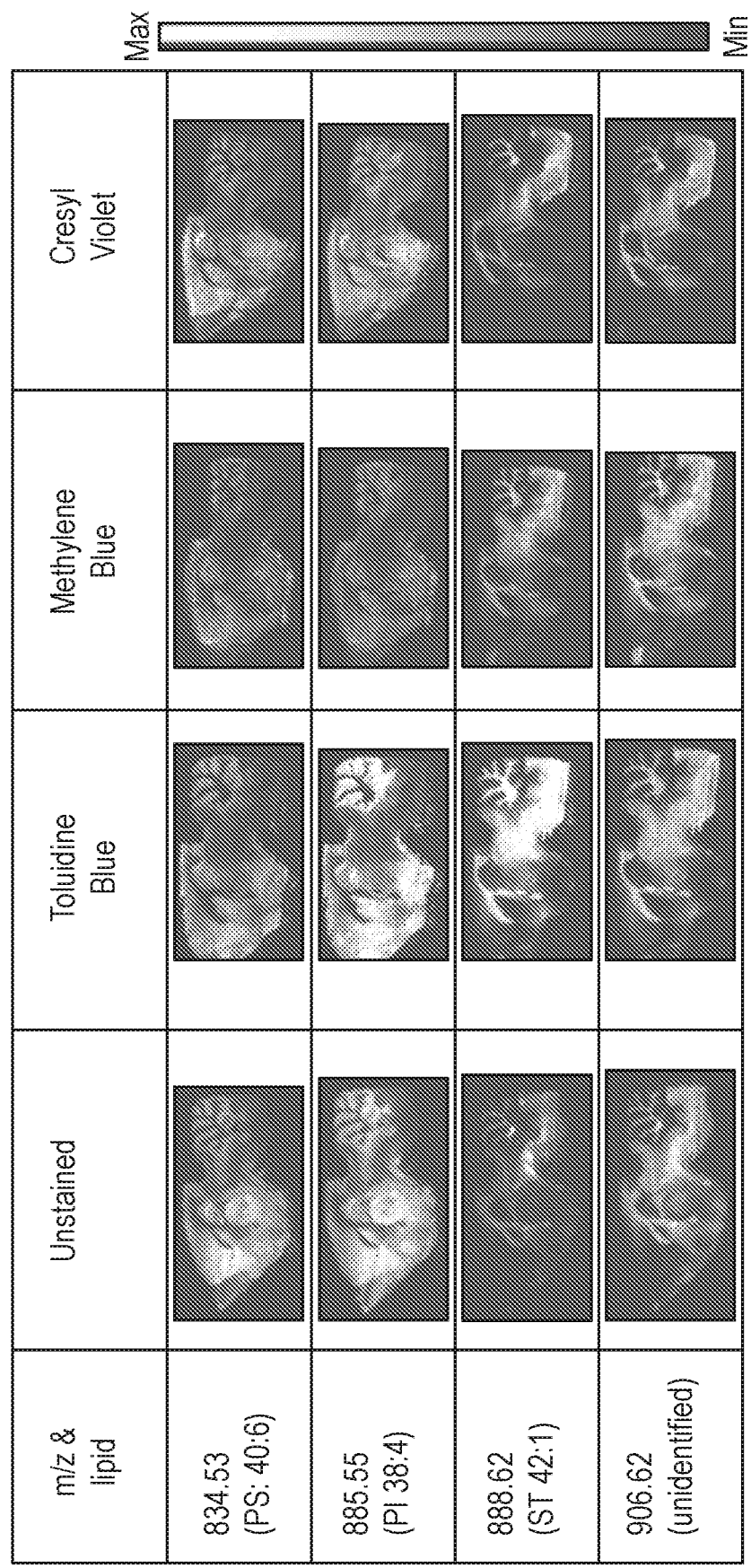
FIG. 10 shows a comparison of DESI-MS imaging using various different tissue stains.

FIG. 10 shows the pixel-by-pixel imaging obtained via DESI-MS imaging of an unstained sample, and samples stained respectively by TB, MB, and CV, for species of various m/z values. Again this shows that these tissue stains do not significantly detriment the imaging results, and that the DESI-MS imaging experiments for the stained tissue samples can produce comparable data to unstained tissue sections, with little delocalisation of lipid species and good levels of lipid detection.

FIG. 10 also shows that at least TB in particular may even provide an improvement in image contrast in comparison with the imaging obtained from the unstained sample. For instance, this may be due to the removal of salts, or other contaminants, from the sample surface during the staining process.

Figure 11:
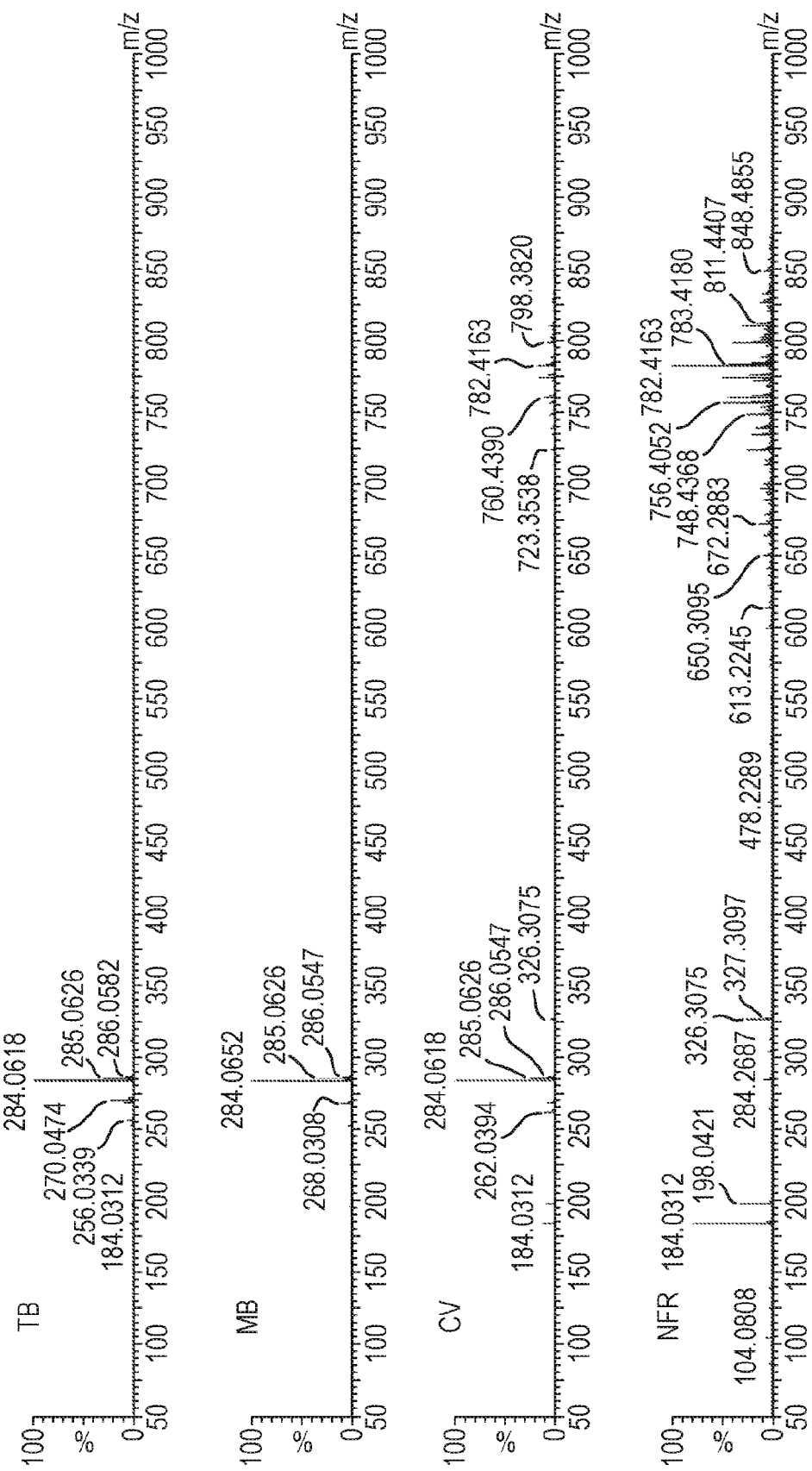
FIG. 11 shows a comparison of positive ion mode DESI-MS results between different tissue stains.

Although the examples above relative to negative ion mass spectrometry, it will be appreciated that a stained sample can also be analysed using positive ion mass spectrometry. FIG. 11 shows a comparison of the mass spectra obtained using positive ion mode DESI-MS to analyse samples that have been stained using TB, MB, CV, and NFR. In FIG. 11, for TB, MB and CV there is a large signal from the dye (in the 250-300 m/z range) that may suppress the signals for the lipid ions of interest in the 600-1000 m/z range. Note that in FIG. 11 there is less suppression of the lipid ions of interest in the spectrum obtained using CV. For positive ion mass spectrometry, because NFR exists as a negatively pre-charged molecule, there is little interference and there is therefore a strong signal for the lipid ions of interest.

Although the present invention has been described with reference to various embodiments, it will be understood by those skilled in the art that various changes in form and detail may be made without departing from the scope of the invention as set forth in the accompanying claims.

The invention claimed is:
1. A method of analysing a tissue sample, wherein the tissue sample comprises a tissue section mounted on a glass slide, the method comprising:
automatically preparing and loading the tissue section onto a sample mounting stage of an analysis system, wherein automatically preparing and loading the tissue section onto a sample mounting stage of an analysis system uses at least a microtome;
automatically identifying one or more regions of interest within the tissue sample based on a tissue stain that has been applied to the tissue sample, wherein the tissue stain is selected from the group comprising: (i) toluidine blue; (ii) methylene blue; (iii) cresyl violet; and (iv) nuclear fast red;

generating analyte material from the one or more regions of interest identified based on the tissue stain using a direct surface sampling technique, wherein the direct surface sampling technique does not require an addition of a matrix to prepare the tissue sample, wherein the direct surface sampling technique comprises a desorption electrospray ionisation ("DESI") or a DESI-derived process;

receiving the generated analyte material at a sampling inlet; and passing the analyte material towards a mass and/or ion mobility spectrometer for analysis, wherein:

the mass and/or ion mobility spectrometer is operated in negative ion mode to obtain negative ion spectra when the tissue stain exists as a positive ion; and the mass and/or ion mobility spectrometer is operated in positive ion mode to obtain positive ion spectra when the tissue stain exists as a negative ion; and a controller configured to automatically process an image of a tissue sample and wherein the controller when automatically processing an image of a tissue sample is configured to create a binary map and reject any objects in the binary map that are touching a border of an active area determined by the controller to show only an area of interest.

2. The method of claim 1, wherein identifying one or more regions of interest within the stained tissue sample based on the tissue staining comprises obtaining an image of the stained tissue sample, and processing the image using an algorithm to identify one or more regions of interest.

3. The method of claim 1, wherein the one or more regions of interest are identified using a machine learning algorithm.

4. The method of claim 1, further comprising imaging the tissue sample.

5. The method of claim 1, further comprising selecting a tissue stain that exists as a positive ion, obtaining a negative ion phospholipid profile for the one or more regions of interest of the tissue sample, and classifying the tissue sample based on the negative ion phospholipid profile.

6. An analysis system comprising:

a sample mounting stage for receiving a stained tissue sample to be analysed, wherein the tissue sample comprises a tissue section;

an automated sample preparation and loading device comprising a microtome, the automated sample preparation and loading device for automatically preparing a tissue section to be analysed and loading the tissue section onto the sample mounting stage for analysis;

a first device for generating analyte material from the tissue sample using any one of desorption electrospray ionisation (DESI) or a desorption electrospray ionisation (DESI)-derived process;

a sampling inlet for receiving the generated analyte material;

a mass and/or ion mobility spectrometer for analysing the generated analyte material, wherein the mass and/or ion mobility spectrometer is configured to (i) operate in negative ion mode to obtain negative ion spectra when the tissue stain exists as a positive ion, and (ii) operate in positive ion mode to obtain positive ion spectra when the tissue stain exists as a negative ion;

transfer tubing for passing the analyte material towards the mass and/or ion mobility spectrometer for analysis;

an image capture device such as a camera for obtaining an image of a tissue sample on the sample mounting stage to which a tissue stain has been applied, wherein the tissue stain is selected from the group comprising: (i) toluidine blue; (ii) methylene blue; (iii) cresyl violet; and (iv) nuclear fast red; and a controller configured to:

automatically process an image of a tissue sample on the sample mounting stage to which a tissue stain has been applied to identify one or more regions of interest; and direct the first device to generate analyte material from the identified region(s) of interest of the stained tissue sample;

wherein:

the image capture device is configured to perform hyperspectral imaging targeted on one or more specific wavelengths of interest to obtain the image of the tissue sample on the sample mounting stage to which a tissue stain has been applied and the wavelength of interest is configured to target specific absorption wavelengths of the applied tissue stain and/or tissue sample components; and wherein the controller when automatically processing an image of a tissue sample is configured to create a binary map and reject any objects in the binary map that are touching a border of an active area determined by the controller to show only an area of interest.

7. The system of claim 6, wherein the processor(s) comprises a machine learning algorithm for automatically processing the image to identify the one or more regions of interest.

8. A method of analysing a tissue sample as claimed in claim 5, wherein the step of classifying the tissue sample based on a negative ion phospholipid profile comprises comparing the negative ion phospholipid profile with a library or a tissue identification database.

9. A method of analysing a tissue sample as claimed in claim 8, wherein the database comprises stained tissue profiles, or unstained tissue profiles, or a mixture of both stained and unstained tissue profiles.

10. An analysis system comprising:

a sample mounting stage for receiving a stained tissue sample to be analysed, wherein the tissue sample comprises a tissue section;

an automated sample preparation and loading device comprising a microtome, the automated sample preparation and loading device for automatically preparing a tissue section to be analysed and loading the tissue section onto the sample mounting stage for analysis;

a first device for generating analyte material from the tissue sample using any one of desorption electrospray ionisation (DESI) or a desorption electrospray ionisation (DESI)-derived process;

a sampling inlet for receiving the generated analyte material;

a mass and/or ion mobility spectrometer for analysing the generated analyte material, wherein the mass and/or ion mobility spectrometer is configured to (i) operate in negative ion mode to obtain negative ion spectra when the tissue stain exists as a positive ion, and (ii) operate in positive ion mode to obtain positive ion spectra when the tissue stain exists as a negative ion;

transfer tubing for passing the analyte material towards the mass and/or ion mobility spectrometer for analysis;

an image capture device such as a camera for obtaining an image of a tissue sample on the sample mounting stage to which a tissue stain has been applied; and a controller configured to:

automatically process an image of a tissue sample on the sample mounting stage to which a tissue stain has been applied to identify one or more regions of interest, wherein the tissue stain is selected from the group comprising: (i) toluidine blue; (ii) methylene blue; (iii) cresyl violet; and (iv) nuclear fast red; and direct the first device to generate analyte material from the identified region(s) of interest of the stained tissue sample:

wherein the controller when automatically processing the image of the tissue sample on the sample mounting stage to which a tissue stain has been applied to identify the one or more regions of interest is configured to filter the image of the tissue sample on the sample mounting stage to which a tissue stain has been applied based on the applied tissue stain; and wherein the controller when automatically processing an image of a tissue sample is configured to create a binary map and reject any objects in the binary map that are touching a border of an active area determined by the controller to show only an area of interest.

11. The system of claim 10, wherein the controller when automatically processing an image of a tissue sample is configured to convert the image into a selected channel of the image to generate a converted image.

12. The system of claim 11, wherein the controller when automatically processing an image of a tissue sample is configured to create a binary map of the converted image by automatic binary thresholding, wherein the binary map is used to identify the region(s) of interest.

13. The system of claim 12, wherein the controller when automatically processing an image of a tissue sample is further configured to fill any holes in the binary map.

14. The system of claim 12, wherein the controller when automatically processing an image of a tissue sample is further configured to reject any objects in the binary map falling below a size threshold.

15. The system of claim 10, wherein the controller uses an image segmentation and/or an object classification algorithm to identify one or more regions of interest.

16. The system of claim 15, wherein the image segmentation algorithm implements k-means factorisation.

17. The system of claim 16, wherein the image segmentation algorithm uses object and boundary finding algorithms configured to operate on the output of the k-means factorisation to identify one or more regions of interest.

18. The method of claim 1, wherein the step of automatically identifying one or more regions of interest within the tissue sample based on a tissue stain that has been applied to the tissue sample, identifies the one or more regions of interest and other regions of the tissue sample, and the step of generating analyte material only generates analyte material from the one or more regions of interest.

* * * * *